US006674920B1

(12) United States Patent
Ishikawa

(10) Patent No.: US 6,674,920 B1
(45) Date of Patent: Jan. 6, 2004

(54) IMAGE PROCESSING APPARATUS

(75) Inventor: Atsushi Ishikawa, Okazaki (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/323,952

(22) Filed: Jun. 2, 1999

(30) Foreign Application Priority Data

Jun. 2, 1998 (JP) .......................................... 10-152812

(51) Int. Cl.[7] ................................................ G06K 9/32

(52) U.S. Cl. ....................... 382/298; 382/305; 382/299; 382/287; 358/448; 358/451; 358/1.2

(58) Field of Search ................................ 382/287, 298, 382/299, 303, 318, 305, 323, 307, 202; 345/574, 660; 348/561, 581, 582, 704; 358/1.2, 3.26, 444, 448, 451, 472, 447, 474

(56) References Cited

U.S. PATENT DOCUMENTS 4,581,759 A * 4/1986 Takahashi .................... 381/97
4,589,029 A * 5/1986 Torimaru et al. ........... 358/224
4,679,096 A 7/1987 Nagashima ................. 358/287
4,757,311 A * 7/1988 Nakamura et al. .......... 340/731
5,029,017 A * 7/1991 Abe et al. ................... 358/451
5,048,114 A * 9/1991 Moriya ....................... 382/298
5,191,623 A * 3/1993 Moriya ....................... 382/312
5,311,336 A * 5/1994 Kurita et al. ................. 358/80
5,486,927 A * 1/1996 Koizumi et al. ............ 358/298
5,522,391 A * 6/1996 Beaudin et al. ........ 128/660.07
5,574,833 A * 11/1996 Yoshiaki ..................... 395/109
5,694,588 A * 12/1997 Ohara et al. ................ 395/566
5,798,841 A * 8/1998 Takahashi ................... 358/296
6,033,441 A * 3/2000 Herbert ...................... 769/400

FOREIGN PATENT DOCUMENTS

JP 06-018435 3/1994

* cited by examiner

*Primary Examiner*—Bhavesh M. Mehta
*Assistant Examiner*—Yosef Kassa
(74) *Attorney, Agent, or Firm*—Burns, Doane, Swecker & Mathis, LLP

(57) ABSTRACT

An image processing apparatus which outputs image data by electrically scaling an image in synchronism with a prescribed clock includes a memory with a one-line capacity for storing image data. A write address in the memory is initialized on a page by page basis and is incremented in accordance with a specified magnification ratio and with the position of a specified region, while a read address in the memory is initialized on a page by page basis and is incremented in accordance with the specified. magnification ratio and with the position of a specified region. The incrementing of the read address is started with a delay of one line with respect to the write address, with provisions made to generate an equal number of write addresses and read addresses per line. This makes scaling and translational transformations in the main scanning direction possible while allowing memory write and read operations to be performed simultaneously with a memory capacity of only one line.

8 Claims, 12 Drawing Sheets

1
image input section
2
image processing section
3
image output section
4
control section (MPU)
5
operation/ display section external device
serial I/O
31
operation panel CPU
ROM
RAM
operation keys
display
32
read scan CPU
ROM
RAM
33
image processing CPU
ROM
RAM
34
timing adjusting CPU
ROM
RAM
CCD
16
image processing section
2

1
image input section
input image data
scaling control
44
52
memory
read address RA
write address WA
51
memory controller
scaled image data
3
image output section
pixel synchronization signal CLK
horizontal synchronization signal HSYNC
read start signal TG
horizontal effective region signal HD

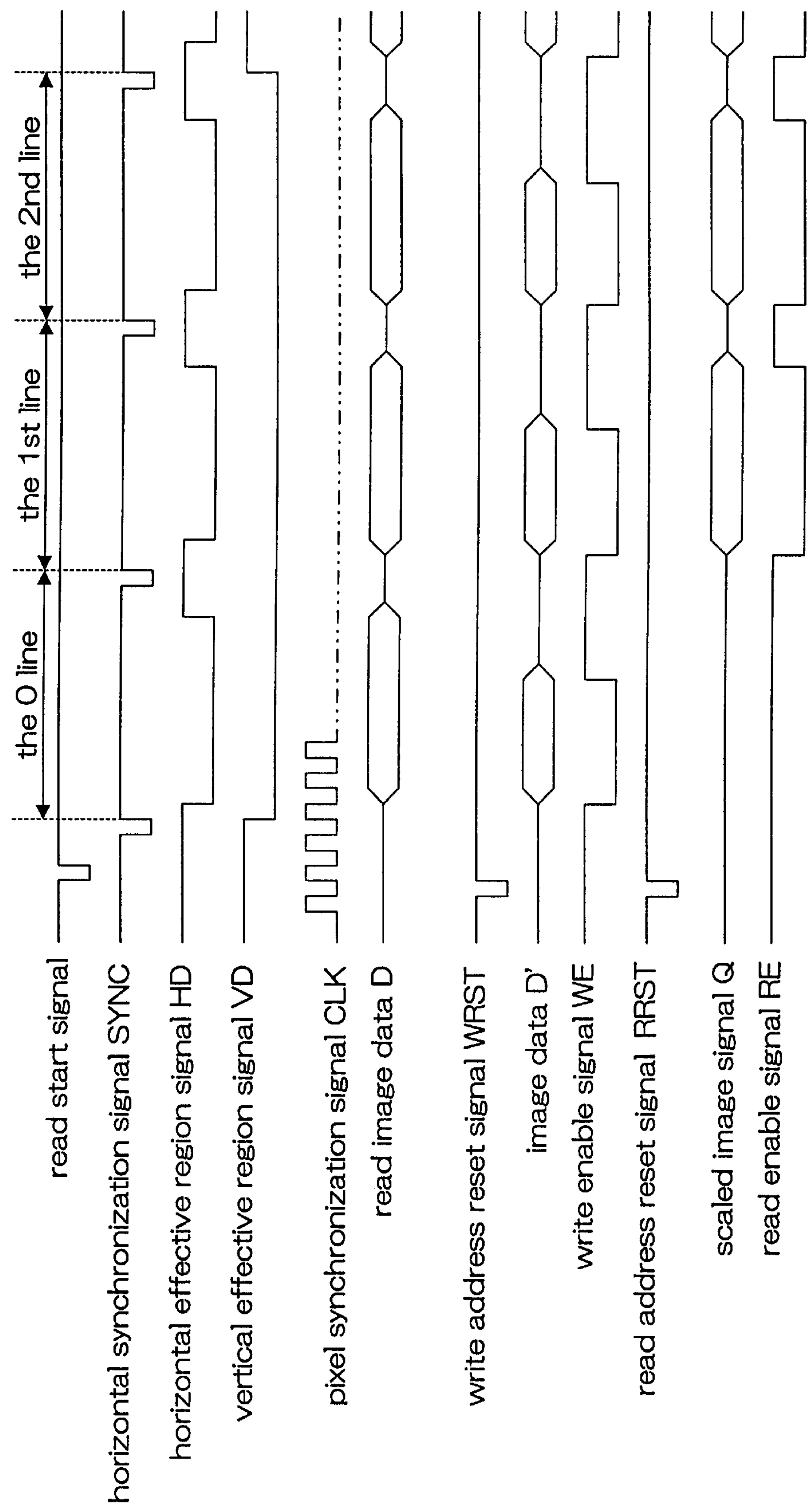
Fig.9
the 0 line
the 1st line
the 2nd line
read start signal
horizontal synchronization signal SYNC
horizontal effective region signal HD
vertical effective region signal VD
pixel synchronization signal CLK
read image data D
write address reset signal WRST
image data D'
write enable signal WE
read address reset signal RRST
scaled image signal Q
read enable signal RE horizontal synchronization signal SYNC
horizontal effective region signal HD
pixel synchronization signal CLK
read image data D
write clock WCK
write address WA
write image data D
write enable signal WE
read clock RCK
read address RA
read image data Q
read enable signal RE
the nth line
Dn0
Dn1
Dn2
Dn3
An0
An1
An2
An3
4094
4095
0
1
An-1,0
An-1,1
Dn-1,0
Dn-1,1 input image
0
2000
4000
horizontal effective region
write region
image before scaling
enlargement 200%
0
4000
horizontal effective region
read region
image after scaling
output image input image
0
4000
horizontal effective region
write region
image before scaling
reduction 50%
0
2000
4000
horizontal effective region
read region
image after scaling
output image

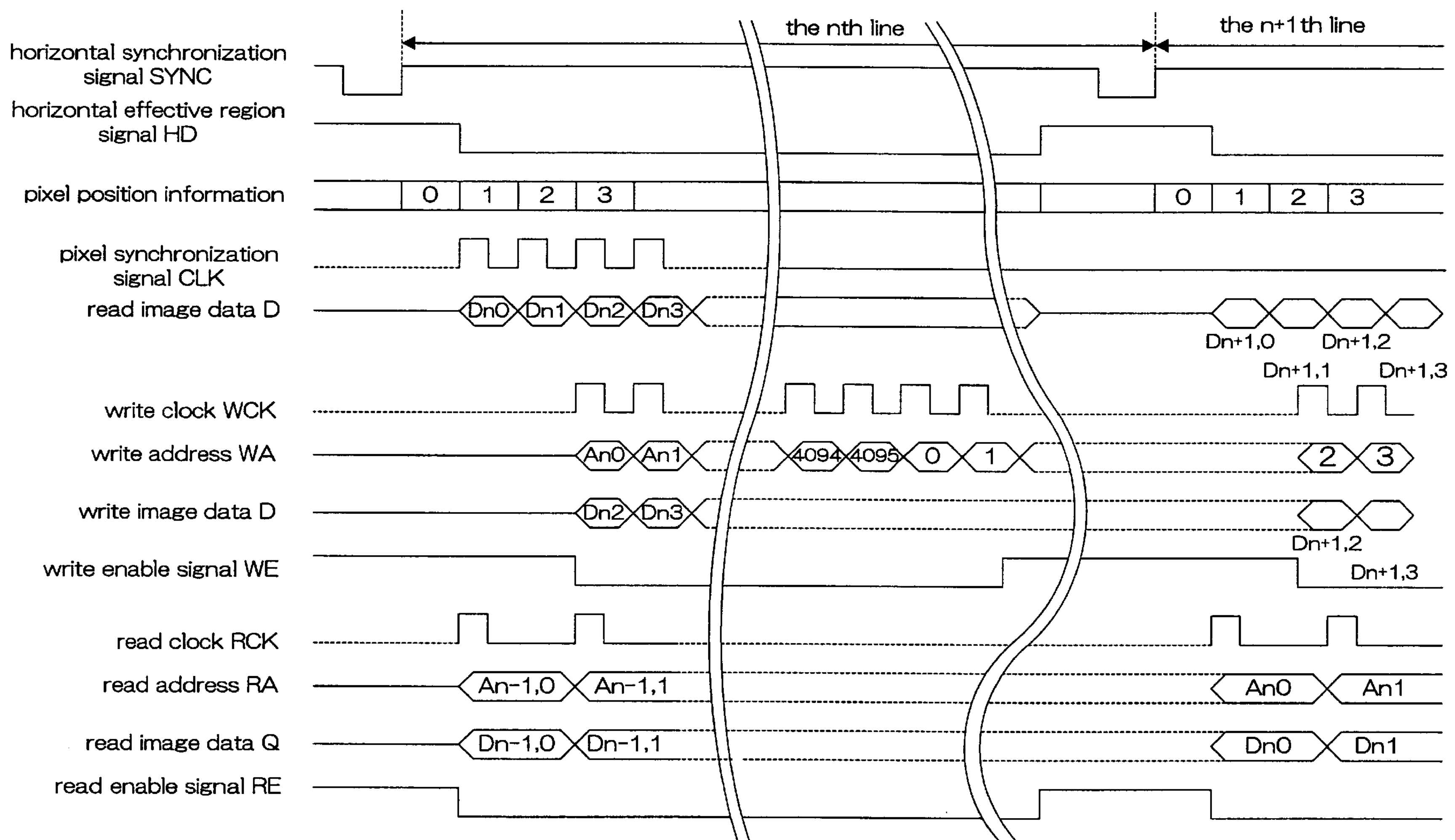
Fig.14
the nth line
the n+1 th line
horizontal synchronization signal SYNC
horizontal effective region signal HD
pixel position information
0
1
2
3
pixel synchronization signal CLK
read image data D
Dn0
Dn1
Dn2
Dn3
Dn+1,0
Dn+1,1
Dn+1,2
Dn+1,3
write clock WCK
write address WA
An0
An1
4094
4095
write image data D
write enable signal WE
read clock RCK
read address RA
An-1,0
An-1,1
read image data Q
Dn-1,0
Dn-1,1
read enable signal RE

IMAGE PROCESSING APPARATUS

RELATED APPLICATION

This application is based on application No. 10-152812 filed in Japan, the entire content of which is hereby incorporated by reference.

BACKGROUND OF THE INVENTION

1. Field of the Invention

The present invention relates to an apparatus which enlarges or reduces an image by electrically processing image data.

2. Description of the Related Art

As is known in the art, some image processing apparatuses designed to handle digital images are equipped with a function wherein image data is stored in a memory and the image data input in synchronism with a prescribed pixel clock is electrically scaled (the image size is enlarged or reduced). Regarding the electrical image scaling, U.S. Pat. No. 4,679,096, for example, proposes a technique which varies memory write clock and read clock in accordance with the scaling ratio. This technique, however, requires a memory capacity of two lines if write and read are to be performed simultaneously.

Japanese Patent Examined Publication No. 6-18435, on the other hand, proposes an address control method for reading out image data written to a memory. This method also requires a memory capacity of two lines if write and read are to be performed simultaneously.

U.S. Pat. No. 5,029,017 discloses an image processing apparatus capable of enlarging and reducing images. This apparatus is also capable of moving the enlarged or reduced image to a desired area by varying the read start address and write start address in an input buffer and an output buffer.

However, with the above-described electrical scaling methods, if memory write and memory read operations are to be performed simultaneously, a memory capacity of one line for memory writing and a memory capacity of one line for memory reading are separately needed. That is, the problem is that a memory capacity of two or more lines is required. It is, however, desirable to reduce the memory capacity from the viewpoint of reducing component cost, etc.

SUMMARY OF THE INVENTION

It is an object of the present invention to resolve the above problem.

It is another object of the invention to provide an apparatus or method which accomplishes image scaling with a memory of small capacity.

These and other objects are attained by an image processing apparatus having a memory for storing image data, writing means for inputting image data of a number of pixels, which is calculated by dividing a number of pixels included in one line by a magnification ratio, into the memory, and reading means for outputting the input image data in synchronism with a clock with respect to the magnification ratio, wherein a line output by the reading means is delayed for one line with respect to a line input by the writing means.

The invention itself, together with further objects and attendant advantages, will best be understood by reference to the following detailed description taken in conjunction with the accompanying drawings.

BRIEF DESCRIPTION OF THE DRAWINGS

FIG. 9 is a first timing chart for image scaling in a first embodiment;

FIG. 14 is a timing chart for image scaling and translation in a second embodiment.

In the following description, like parts are designated by like reference numerals throughout the several drawings.

DESCRIPTION OF THE PREFERRED EMBODIMENTS

Figure 1:
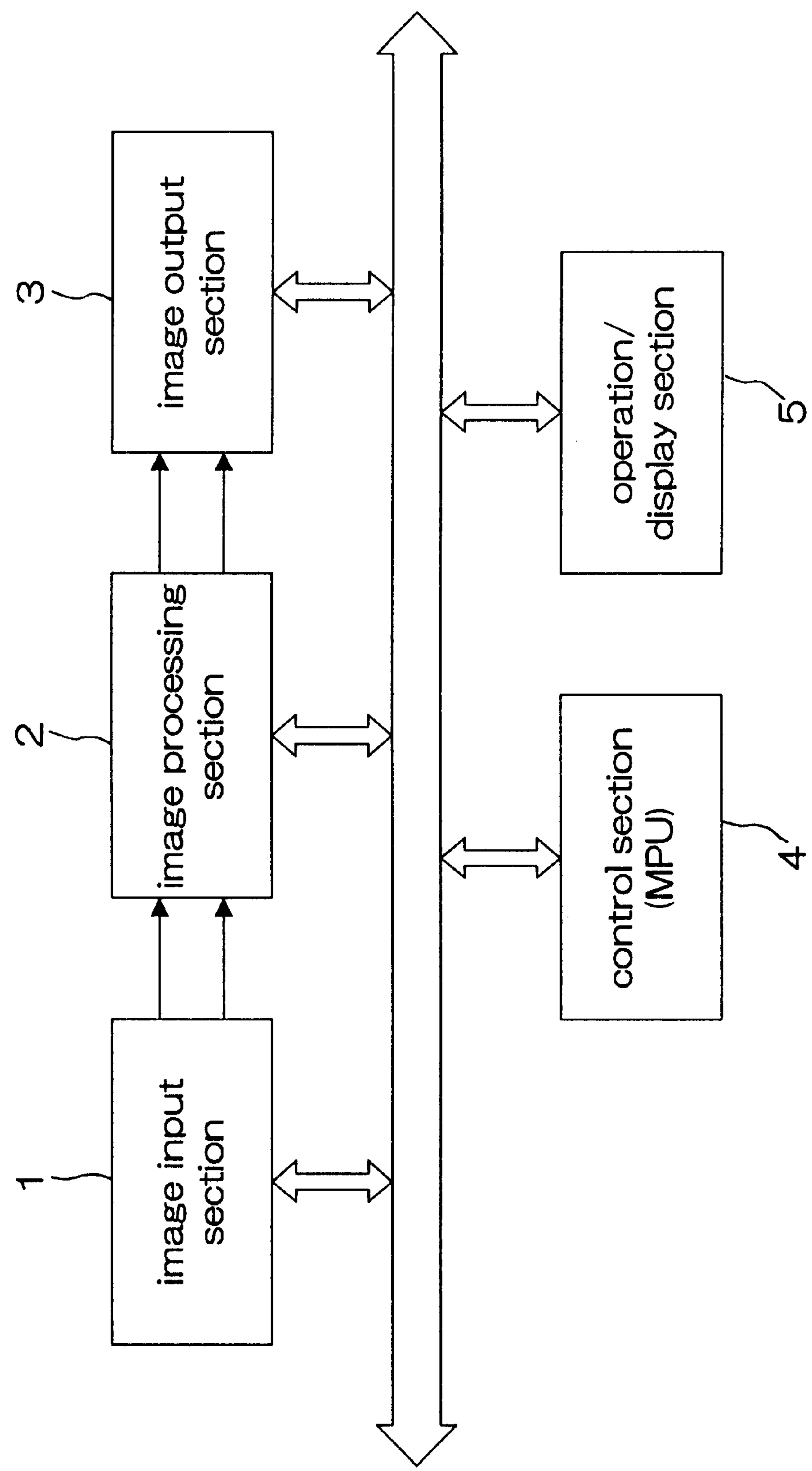
FIG. 1 is a block diagram showing the configuration of a digital copying machine.

Embodiments of the present invention will be described below with reference to the accompanying drawings. Throughout the drawings, like reference numerals designate like or corresponding parts.

FIG. 1 is a block diagram showing the configuration of a digital copying machine. An image input section 1 reads a document image by photoelectric conversion and outputs an analog signal. An image processing section 2 applies processing such as A/D conversion, shading correction, etc. to the thus read signal. The resulting digital image data is then supplied to an image output section 3. A control section 4 controls the entire operation of the copying machine in accordance with setting information from an operation/display section 5.

Figure 2:
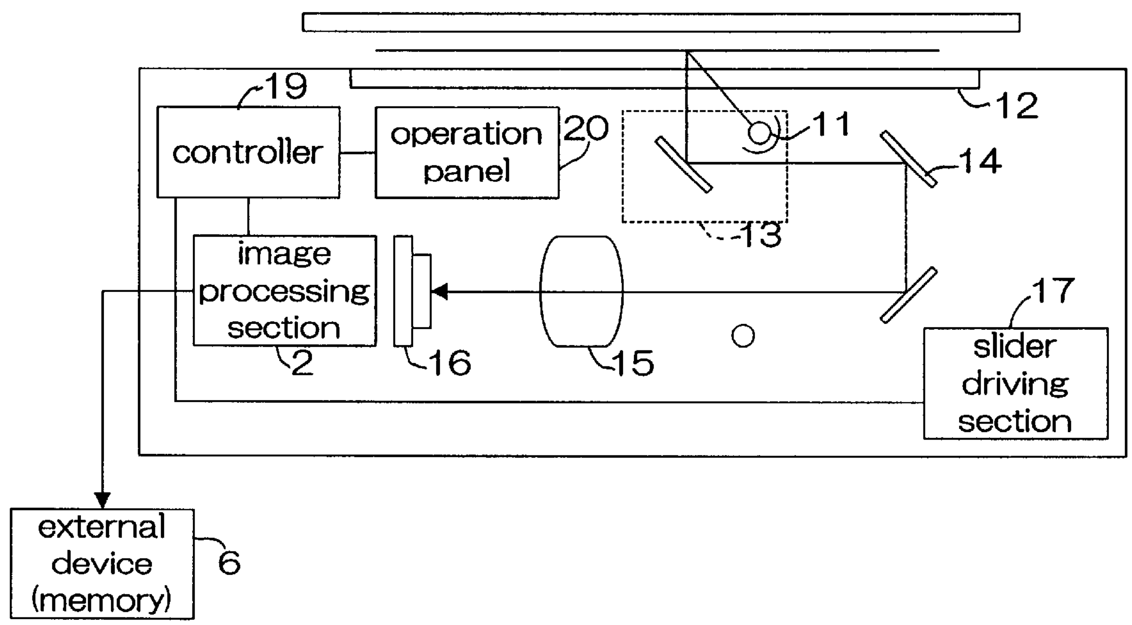
FIG. 2 is a block diagram showing an image input section.

FIG. 2 is a block diagram showing the image input section 1. A scanner 13 comprises a mirror and a light source 11 extending longitudinally along the main scanning direction, and is driven in reciprocating fashion in the sub scanning direction by means of a motor housed in a slider driving section 17. The scanner 13 thus scans the document placed on a document glass 12. Light reflected from the document is directed to a CCD sensor 16 via a mirror 14 and a lens 15. The CCD sensor 16 photoelectrically converts the reflected light, and outputs an analog signal which is supplied to the image processing section 2.

The image processing section 2 converts the analog electrical signal to a digital signal, and applies processing such as shading correction. Thereafter, the image data is output to an external device 6 (the image output section 3) such as a printer or an image memory. The user makes settings for copy magnification ratio, document size, exposure level, etc. on an operation panel 20 included in the operation/display section 5. When the user depresses a start key 25 (FIG. 3), the reading is started. A controller 19 (constituting a portion of the control section 4 shown in FIG. 1) controls the entire operation of the image input section in accordance with the setting information entered from the operation panel 20.

Figure 3:
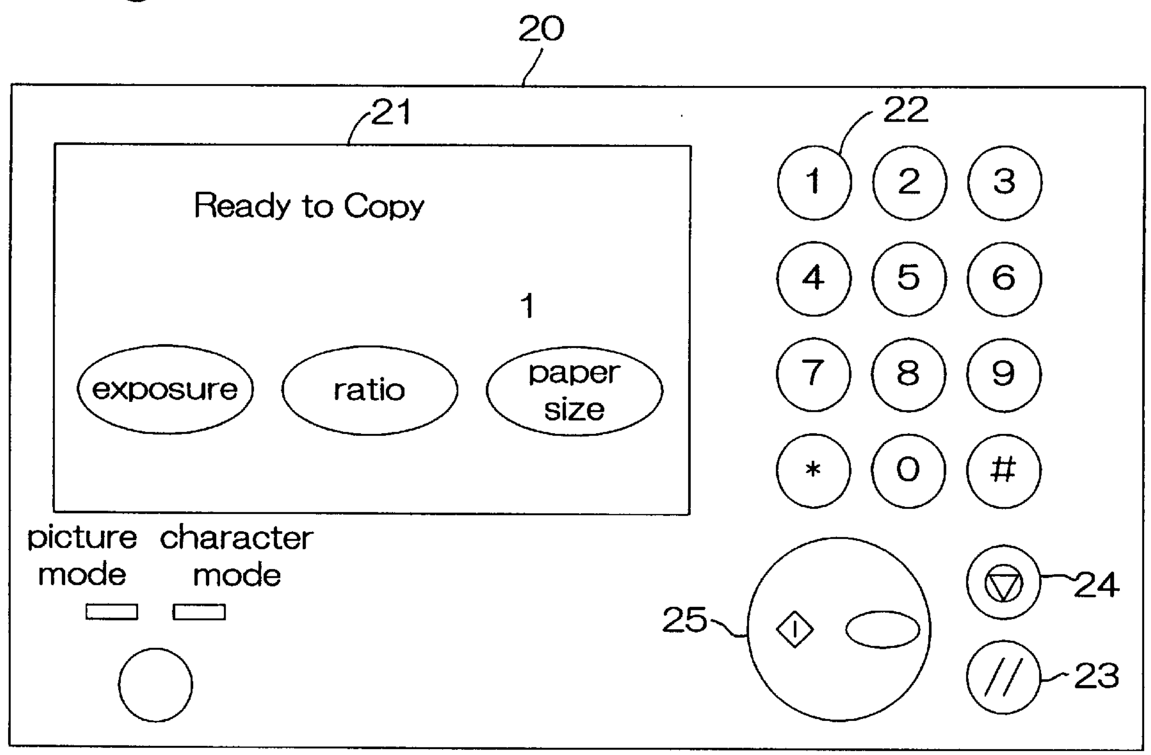
FIG. 3 is a plan view of an operation panel.

FIG. 3 shows the operation panel 20 having various keys and a display. The operation panel 20 includes a liquid crystal touch panel 21, a numeric key pad 22 for entering the number of copies to be made, copy magnification ratio, etc., a reset key 23 for setting copier settings back to its standard settings, a stop key 24 for stopping a copy operation, and a start key 25 for starting a copy operation. The liquid crystal touch panel 21 displays copier operation status such as the exposure level, copy magnification ratio, and copy paper size, and copier trouble status such as the occurrence of paper jam, paper empty, and other trouble conditions, and enables settings to be made for the exposure level, copy magnification ratio, copy paper, etc.

Figure 4:
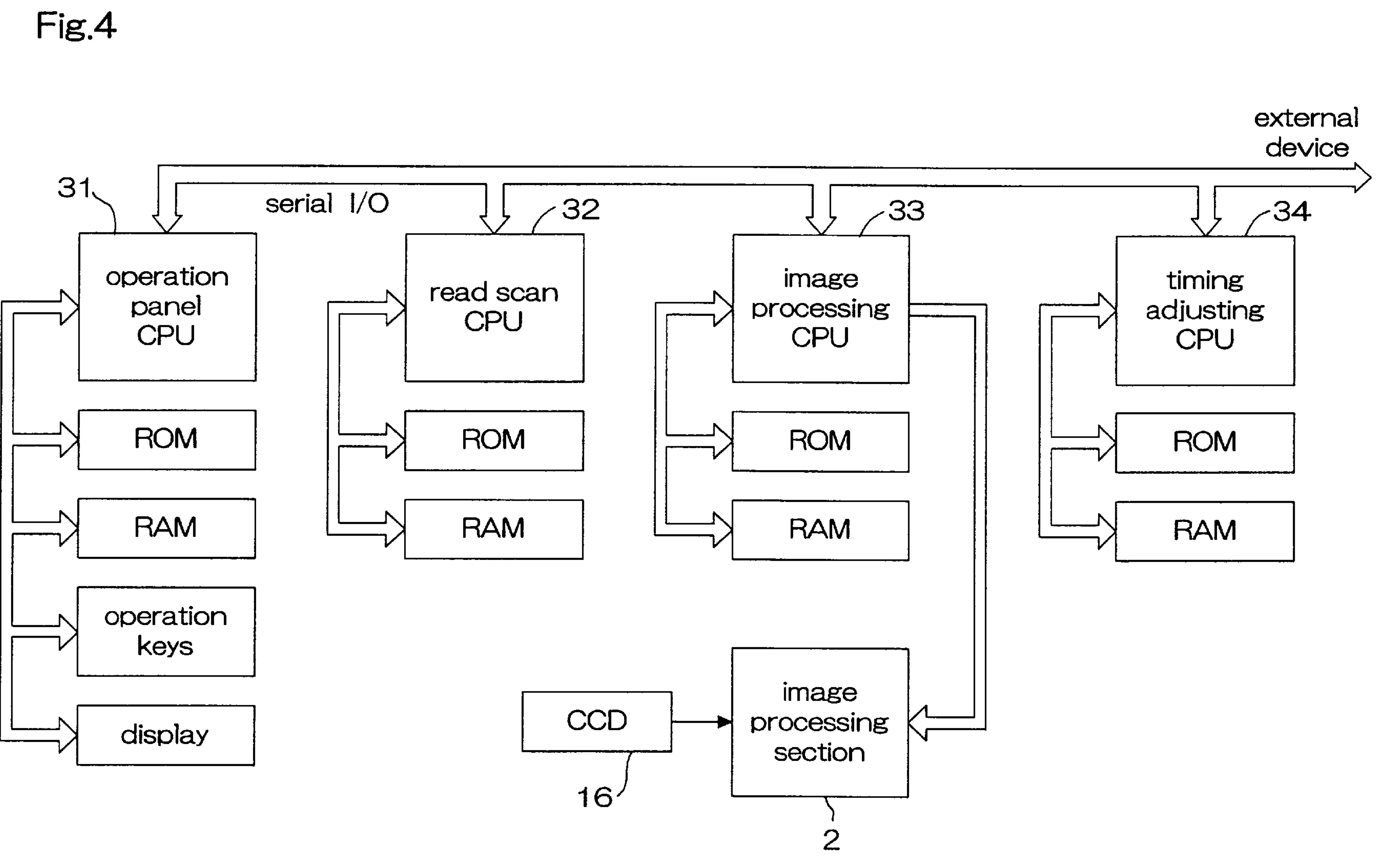
FIG. 4 is a block diagram showing a control section.

The control section 4 shown in FIG. 4 includes an operation panel CPU 31, a read scan CPU 32, an image signal processing CPU 33, and a timing adjusting CPU 34. A ROM containing a program, a RAM providing a work area, etc. are connected to each of these CPUs. The operation panel CPU 31, the image signal processing CPU 33, and the timing adjusting CPU 34 are interconnected by a serial input/output interface (serial I/O) to transfer information between them.

The operation panel CPU 31 controls inputs from the various keys on the operation panel 20 and outputs to the display. The image processing CPU 33 controls the image processing section 2. The read scan CPU 32 controls the scanning system consisting of the scanner 13, CCD sensor 16, slider driving section 17, etc. The timing adjusting CPU 34 performs processing relating to the operation mode setting and the overall timing adjustment between the control section 4 and the external device 6 such as a printer or an image memory.

Next, the general operational sequence of the copying machine will be described. When the start key 25 is depressed, a start request is issued from the operation panel CPU 31 to the timing adjusting CPU 34. In response, the timing adjusting CPU 34 issues a read request to the image processing CPU 33 and an output request to the external device 6.

When an operation ready notification is received from the external device 6, the image processing CPU 33 issues a scan request to the read scan CPU 32. In response, a scanning operation is started, with the read scan CPU 32 controlling the reading of the document in accordance with the operation mode set on the operation panel 20. The scanned image is then subjected to image processing appropriate to the processing mode set by the image processing CPU 33, and the processed image is supplied to the external device 6. When the scanning of the document is completed, the read scan CPU 32 sends a scan completion notification to the image processing CPU 33. Then, the image processing CPU 33 sends a read completion notification to the timing adjusting CPU 34.

Figure 5:
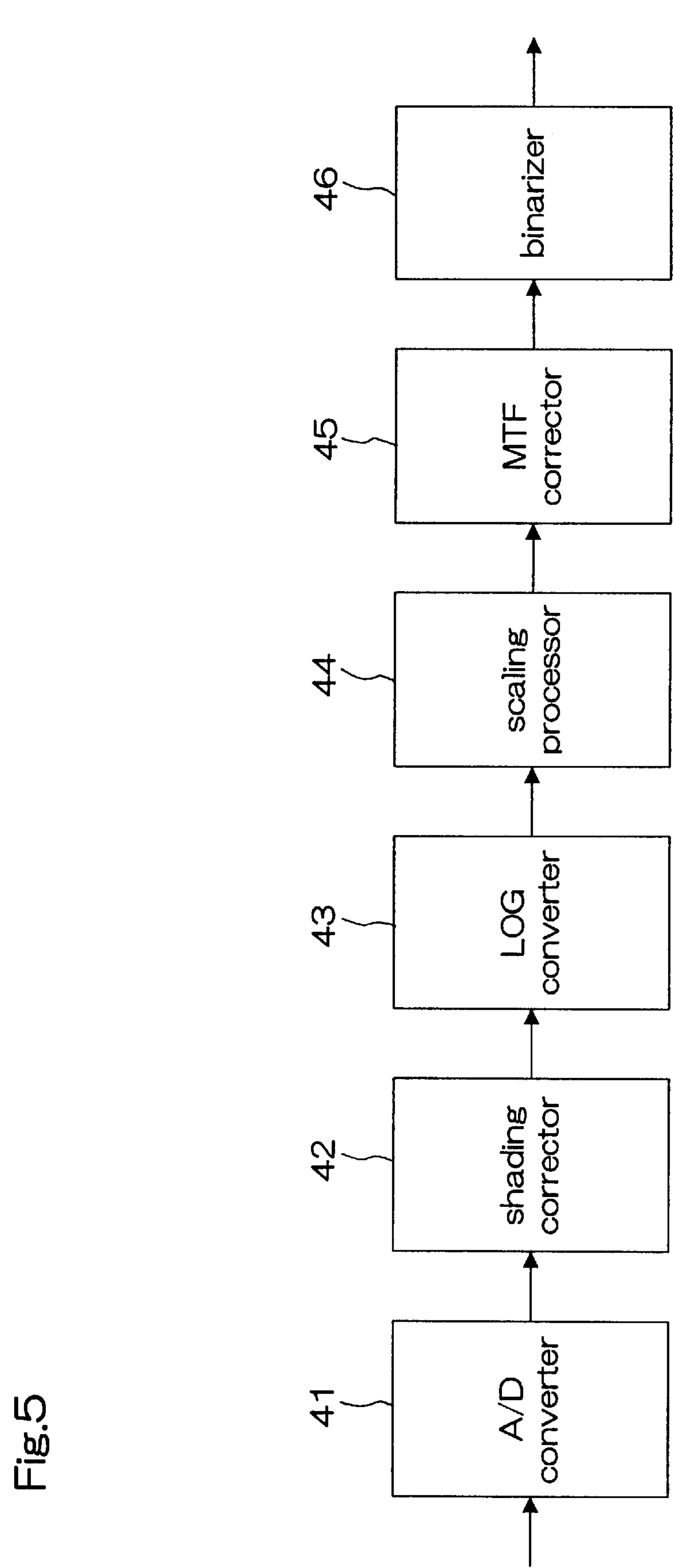
FIG. 5 is a block diagram showing an image processing section.

FIG. 5 shows a block diagram of the image processing section 2. The image processing section 2 comprises an A/D converter 41 for converting an analog signal, photoelectrically converted by the CCD sensor 16, into a digital signal, a shading corrector 42 for performing shading correction, a LOG converter 43 for performing LOG conversion, a scaling processor 44 for performing image scaling, an MTF corrector 45 for performing MTF correction, a binarizer 46 for performing binarization. In operation, the image data input from the image input section 1 is fed into the A/D converter 41 where the analog signal is converted into a digital image signal. Next, the shading corrector 42 applies a correction to the digital signal (document read data) to eliminate unevenness in light in the main scanning direction on the image. Prior to the reading of the document, a shading correction white plate is read by the CCD sensor 16 and the resulting digital data is stored in memory. When the document is read, the document read data is corrected by reference to the data stored in the memory. Next, the LOG corrector 43 performs LOG conversion using a lookup table in order to obtain gray scale image data. Next, the scaling processor 44 electrically enlarges or reduces image size in the main scanning direction by controlling memory read and write operations for the LOG converted data. Then, the MTF corrector 45 applies a correction to enhance image sharpness, etc. The binarizer 46 binarizes the thus processed image data, and supplies the binarized data to the image output section 3.

Figure 6:
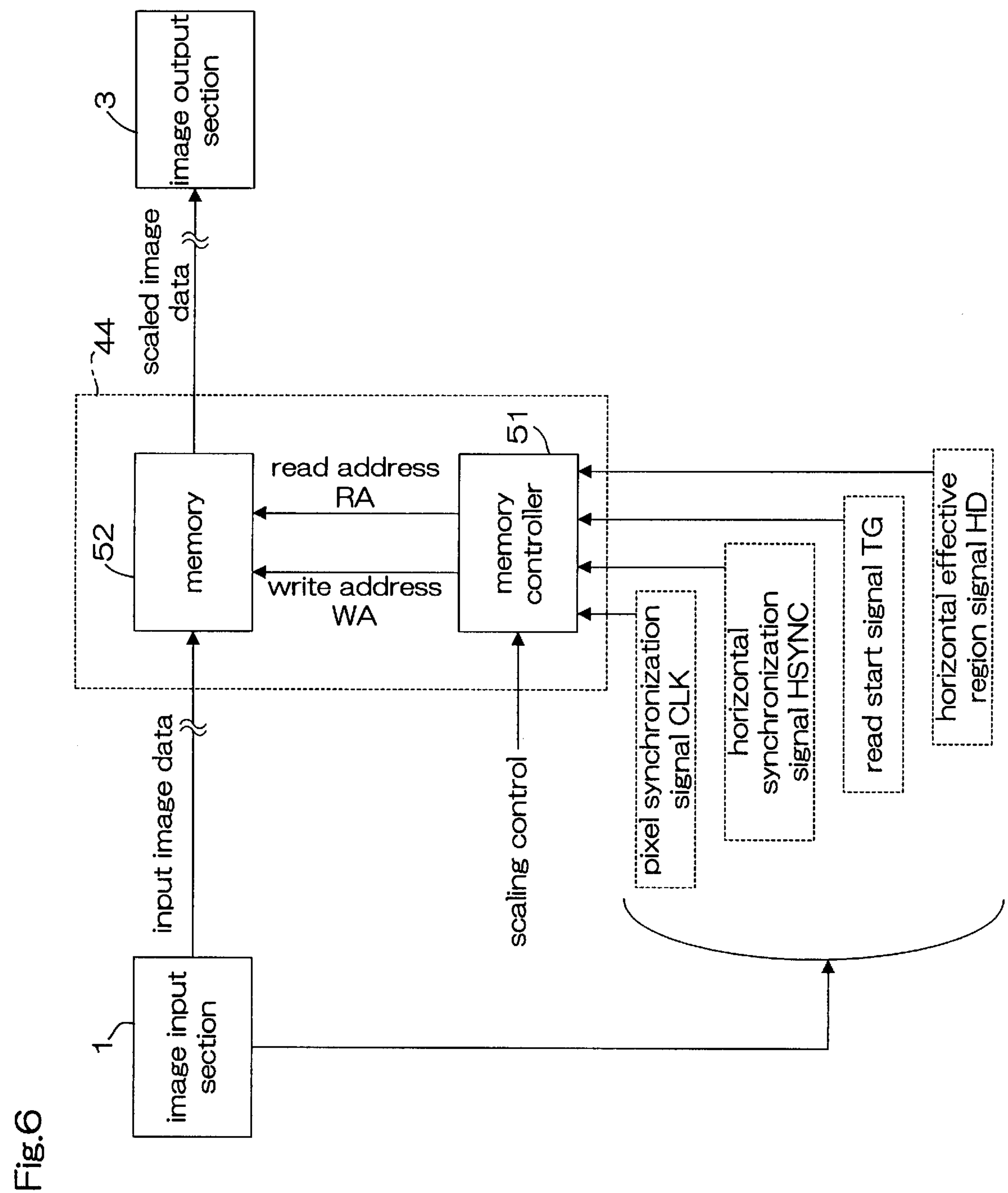
FIG. 6 is a conceptual diagram of a scaling control section.

The scaling processor 44, using a memory, performs electrical enlargement or reduction operations (electrical scaling) on the image data input in synchronism with a prescribed clock. The thus scaled image data is output in synchronism with a prescribed clock. FIG. 6 is a conceptual diagram of the scaling processor 44. To perform electrical scaling, the scaling processor 44 controls the memory 52 based on control signals such as an image synchronization signal CLK, a horizontal synchronization signal HSYNC, a read start signal TG, and a horizontal effective region signal HD, supplied from the image input section 1, and on scaling control information supplied from the operation/display section 5. A memory controller 51 generates a memory control signal. The scaled image data is further subjected to the MTF correction and binarization before being supplied to the image output section 3.

Figure 7:
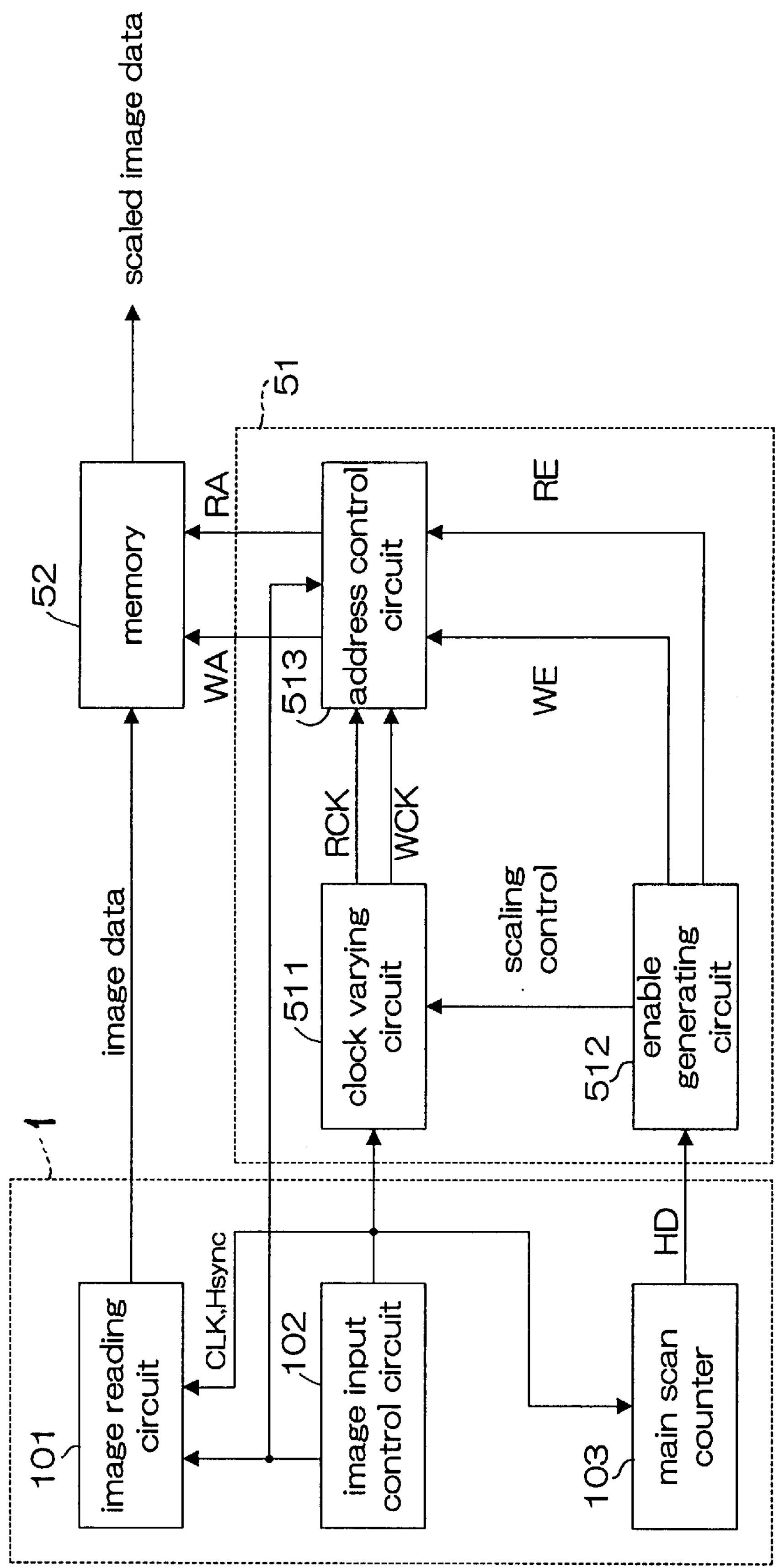
FIG. 7 is a block diagram showing the scaling control section.

FIG. 7 is a block diagram showing the scaling processor 44 in concrete form. In the image input section 1, an image reading circuit 101 reads the document image and outputs digital image data. The image reading circuit 101 starts reading the document image on a line by line basis in accordance with the read start signal TG and horizontal synchronization signal HSYNC supplied from an image input control circuit 102, and supplies the thus read image data to the memory 52 in accordance with the pixel synchronization signal CLK supplied from the image input control circuit 102. The image input control circuit 102 supplies the read start signal TG, pixel synchronization signal CLK, and horizontal synchronization signal HSYNC to various blocks. A main scan counter 103 calculates the pixel position in the main scanning direction based on the horizontal synchronization signal HSYNC and pixel synchronization signal CLK output from the image input control circuit 102. The main scan counter 103 is initialized by the horizontal synchronization signal HSYNC and incrementally counts up with the pixel synchronization signal CLK.

In the memory controller 51, a clock varying circuit 511 generates, from the pixel synchronization signal supplied from the image input control circuit 102, a write synchronization signal WCK for incrementally varying a write address and a read synchronization signal RCK for incrementally varying a read address in accordance with the scaling ratio. For example, when the magnification ratio is 200%, the pixel synchronization signal CLK is directly output as the write synchronization signal WCK, and a signal generated by decimating the pixel synchronization signal CLK by a factor of 2 is output as the read synchronization signal RCK. Conversely, when the magnification ratio is 50%, the write synchronization signal WCK is generated by decimating the pixel synchronization signal CLK by a factor of 2, while the pixel synchronization signal CLK is directly output as the read synchronization signal RCK.

An enable generating circuit 512 generates a write enable signal WE and a read enable signal RE for input to the memory 52, from the main scanning direction pixel position information output from the main scan counter 103 and the scaling control information necessary for scaling. For example, when the magnification ratio is 200%, the write enable signal WE is enabled only for a time equal to one half the period of the horizontal effective region signal HD of the image-reading circuit, while the horizontal effective region signal HD is directly used as the read enable signal RE. Conversely, when the magnification ratio is 50%, the horizontal effective region signal HD is directly used as the write enable signal WE, while the read enable signal is enabled only for a time equal to one half the period of the horizontal effective region signal HD.

Figure 8:
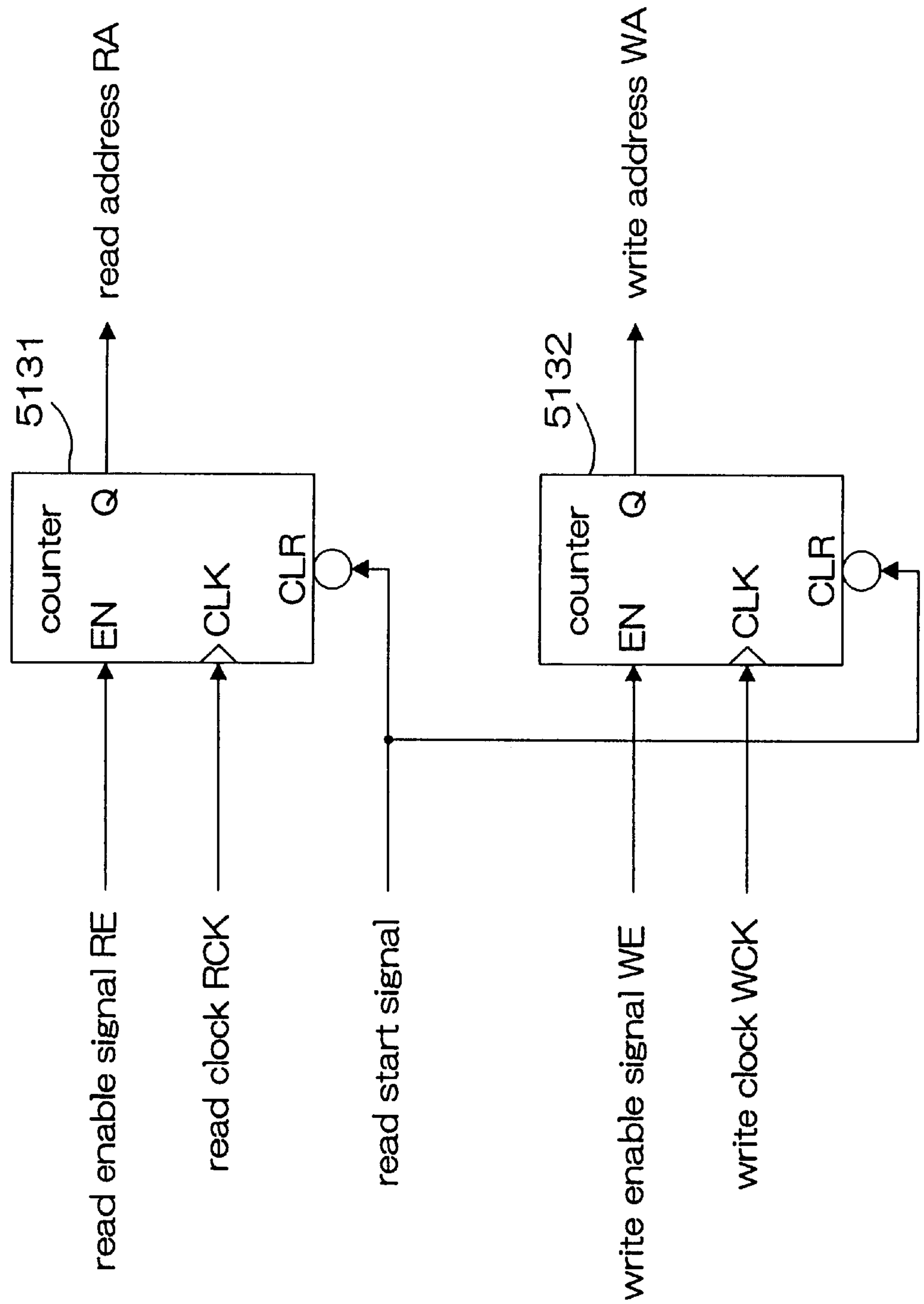
FIG. 8 is a block diagram of an address control circuit.

FIG. 8 shows an address control circuit 513. The address control circuit 513 controls the write address WA and read address RA for the memory 52. A counter 5131 incrementally counts up in synchronism with the read synchronization signal RCK during the active period of the read enable signal RE. The counter is initialized by the read start signal TG. A counter 5132 incrementally counts up in synchronism with the write synchronization signal WCK during the active period of the write enable signal WE. The counter is initialized by the read start signal TG. The initialization of the counters 5131 and 5132 is performed on a page by page basis. In the memory 52, the image data output from the image reading circuit 101 in synchronism with the pixel synchronization signal CLK are sequentially stored at the write address WA output from the address control circuit 513. The memory 52 sequentially outputs the image data from the read address RA output from the address control circuit 513.

Figure 10:
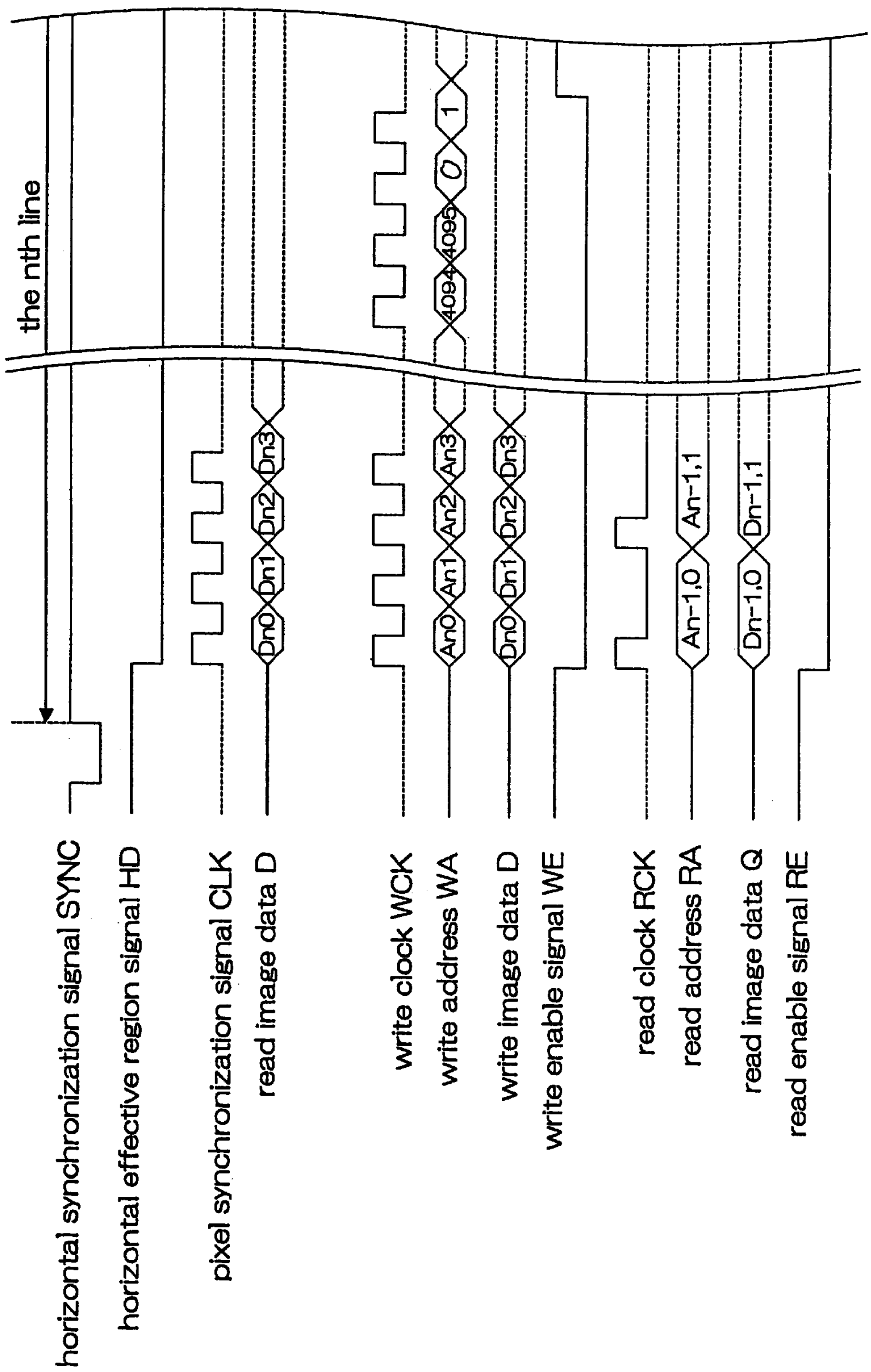
FIG. 10 is the first half portion of a second timing chart for image scaling in the first embodiment.
Figure 12:
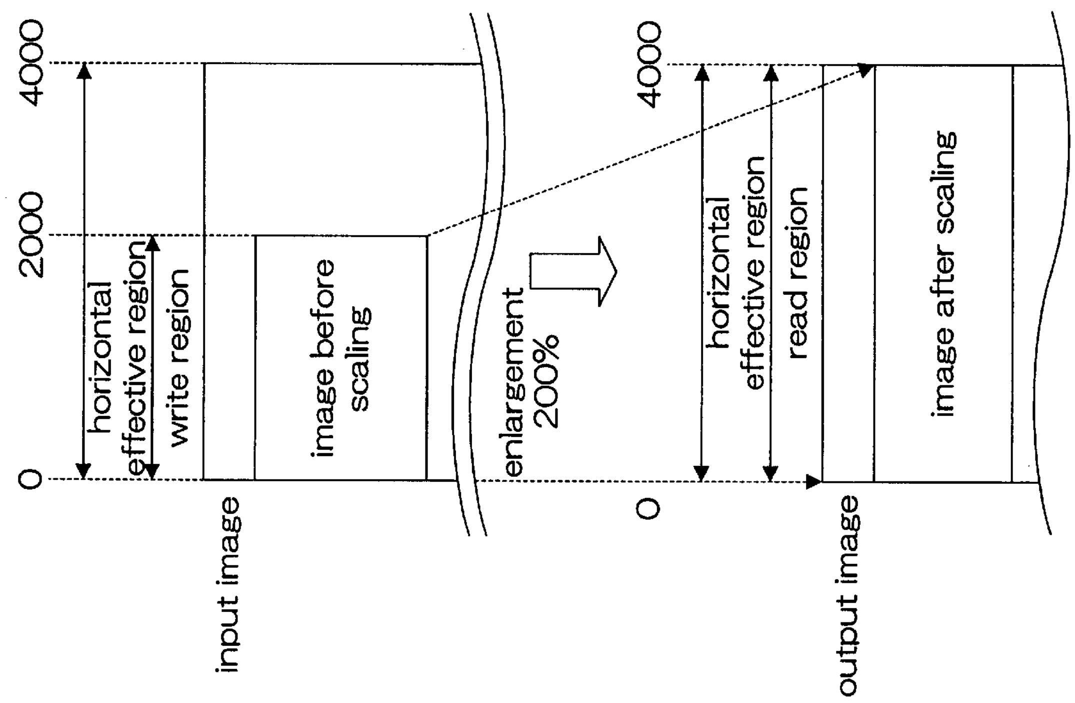
FIG. 12 is a diagram illustrating image scaling for enlarging an image.
Figure 13:
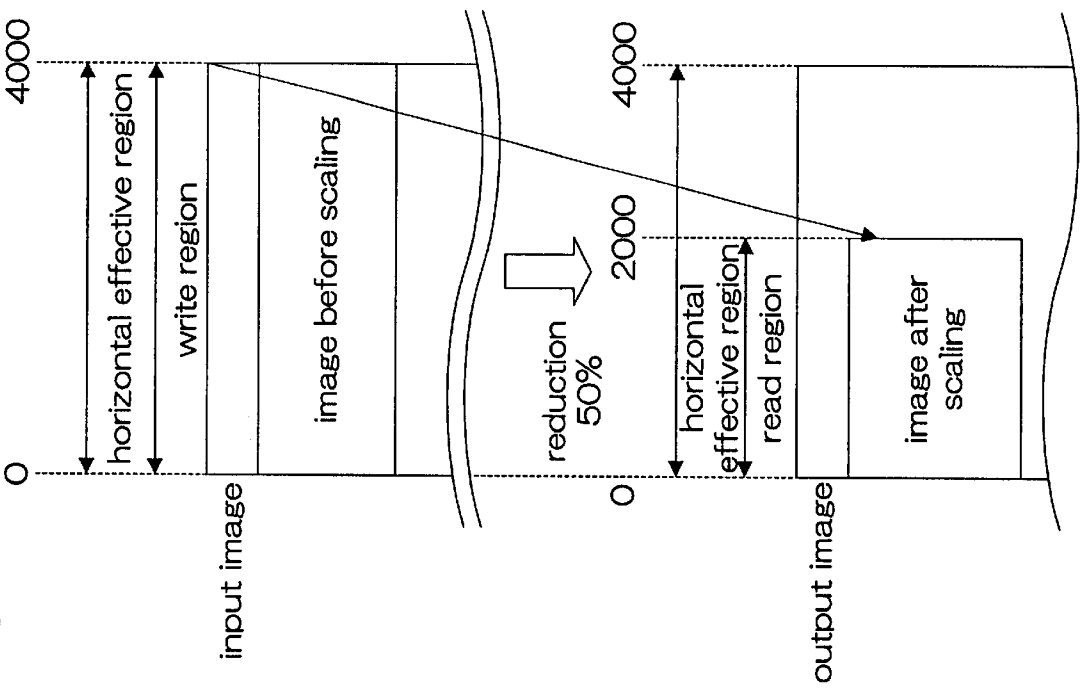
FIG. 13 is a diagram illustrating image scaling for reducing an image.

Operation of the various signals in the scaling process will be described in detail with reference to the timing charts of FIGS. 9 and 10. In the scaling process, the initialization of the memory read address and write address for scaling is performed at the beginning of a page. Further, the number of memory write data and the number of memory read data for one line are set equal to each other. The memory write address is incremented in accordance with the specified magnification ratio M%. The memory read address is likewise incremented in accordance with the specified magnification ratio M%. In generating the read address, the incrementing of the image address is started with a delay of one line from the generation of the write address. FIGS. 12 and 13 show scaled images, one enlarged and the other reduced.

First, the timing chart of FIG. 9 will be explained. This timing chart illustrates the first three lines of a page in an enlargement process.

When the read start signal TG is input, the image reading circuit 101 starts to read the document image and output the image data. The image is read line by line based on the horizontal synchronization signal HSYNC and horizontal effective region signal HD periodically input on a line by line basis. The thus read image data D is output in synchronism with the pixel synchronization signal CLK. The write enable signal WE is set active only for a period equivalent to the image data region (=write region: see FIGS. 12 and 13) necessary for the scaling of the image data D, and the image data D' is written to the memory 52 during the active period of the enable signal WE. Here, the write address counter 5132 is initialized by a write address reset signal WRST (=read start signal TG) prior to the processing of the 0th line.

Likewise, the read enable signal RE is set active only for a period equivalent to the image data region (=readout region: see FIGS. 12 and 13) necessary for the generation of scaled image data, and the scaled image data Q is output during the active period of the read enable signal RE. Here, the read address counter 5131 is initialized by a read address reset signal RRST (=read start signal TG) prior to the processing of the 1st line.

In read address generation, the incrementing of the read address is started with a delay of one line from the generation of the write address.

The write region and the readout region are set so that (the number of write addresses per line)=(the number of read addresses). The number of write addresses (=the number of read addresses) per line is set equal to A =the number of input image pixels before the scaling multiplied by the reduction ratio (where the reduction ratio is the magnification ratio M%/100 in the case of reducing and 1 in the case of enlarging) or B=the number of output image pixels after the scaling divided by the enlargement ratio (where the enlargement ratio is the magnification ratio M%/100 in the case of enlarging and 1 in the case of reducing)

whichever is smaller. The write region is a region having a pixel width from the write start position to the position equivalent to the number of write addresses divided by the reduction ratio, and the readout region is a region having a pixel width from the read start position to the position equivalent to the number of read addresses multiplied by the enlargement ratio.

For example, in the case of the enlargement shown in FIG. 12 (the magnification ratio is 200%)

A=4000*1=4000

B=4000/2=2000

Hence, the number of write addresses is 2000. Therefore, the write region is from the 0th pixel to the 2000th pixel, and the readout region is from the 0th pixel to the 4000th pixel.

In the case of the reduction shown in FIG. 13 (the magnification ratio is 50%)

A=4000*0.5=2000

B=4000*1=4000

Hence, the number of write addresses is 2000. Therefore, the write region is from the 0th pixel to the 4000th pixel, and the readout region is from the 0th pixel to the 2000th pixel.

Figure 11:
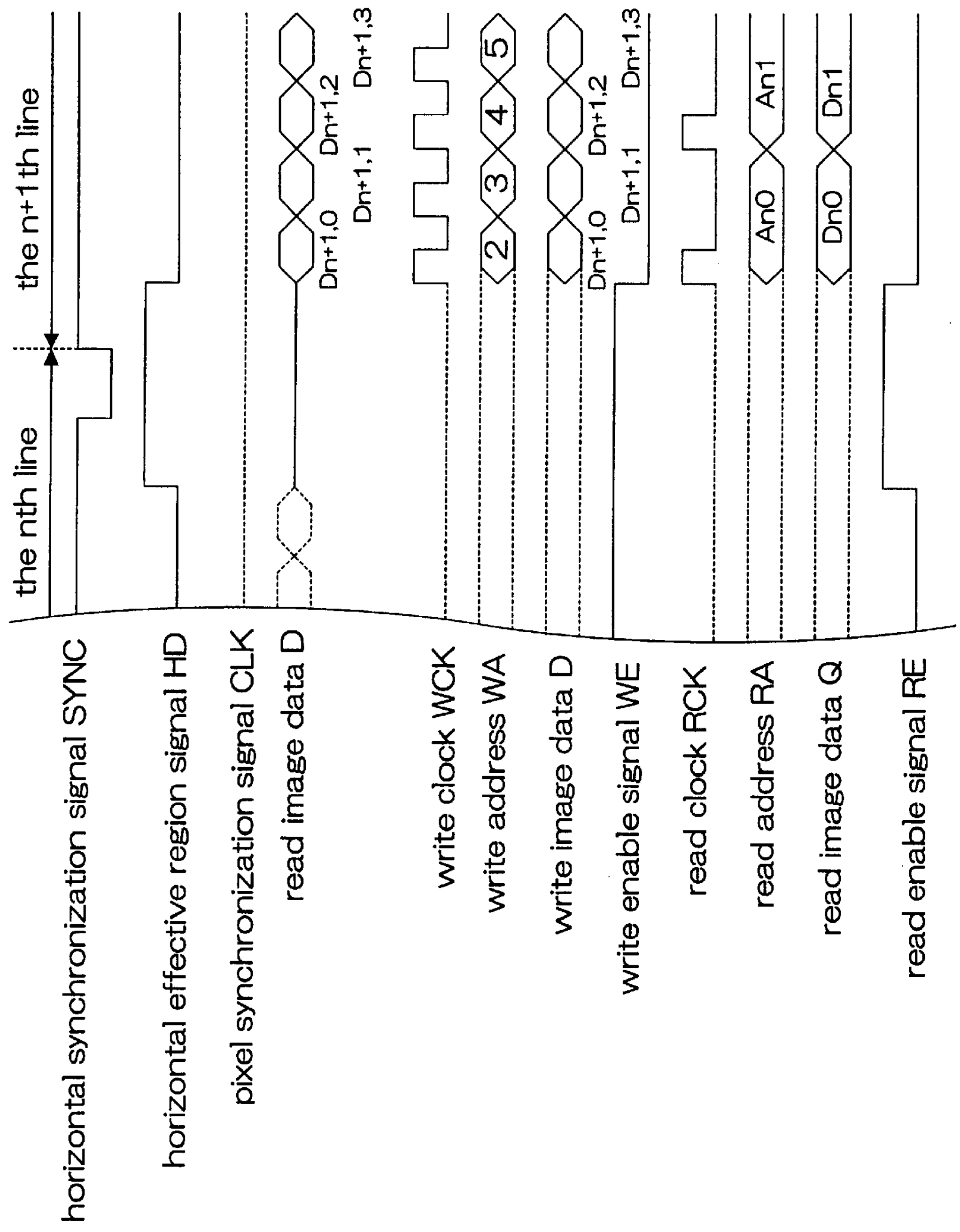
FIG. 11 is the second half portion of the second timing chart for image scaling in the first embodiment.

Next, the timing charts of FIGS. 10 and 11 will be explained. These timing charts illustrate the n-th line and (n+1)th line of a page in an enlargement process. In the n-th line, when the write enable signal WE is active, the write address WA is successively incremented from An0 (address 0 on the n-th line) to 4095 in accordance with the write synchronization signal WCK. The write image data D are sequentially written at the address WA. The write address WA returns to address 0 when the memory capacity is exceeded. In the (n+1)th line, the write address WA is incremented starting from a value equal to one plus the last write address WA on the n-th line. Address reset is performed on a page by page basis. Here, the number of write addresses and the number of read addresses per line are the same, and therefore, the number of memory write data and the number of memory read data per line are set equal to each other. Read address generating means starts address incrementing with a delay of one line compared with write address generating means.

As illustrated, in the n-th line, when the read enable signal RE is active, the read address RA is successively incremented in accordance with the read synchronization signal RCK. Image data D is output from the memory 52 in accordance with the read address. As with the write address WA, the read address RA also returns to address 0 when the memory capacity is exceeded. In the (n+1)th line, the read address RA is incremented starting from a value equal to one plus the last read address on the n-th line. That is, since the number of image data written and the number of image data read out per line are the same, and since the read operation is delayed by one line with respect to the write operation, the first read address RA for the (n+1)th line is AnO, which is the same as the first write address WA for the n-th line.

In this way, since the initialization of the read address and write address of the memory 52 used for scaling operations is performed at the beginning of a page, and since the number of memory write data and the number of memory read data per line are set equal to each other, the scaling in the main scan direction can be performed in real time using the memory 52 having a one-line capacity. Furthermore, since the image data written one line before is always read out before writing data for the next line, memory write and read operations can be performed simultaneously using the memory of one-line capacity. That is, the scaling in the main scan direction can be done in real time with a memory capacity of only one line.

Next, an image processing apparatus as a second embodiment of the present invention will be described. The image processing apparatus of this embodiment applies a translation in the main scanning direction as well as electrical scaling. This image processing apparatus, also using a memory having a one-line capacity for storing output image data, performs scaling to electrically enlarge or reduce an image input in synchronism with a prescribed pixel clock, and outputs the scaled image in synchronism with a prescribed clock. The electrical scaling using the memory is the same as that performed in the digital copying machine of the first embodiment, except that a translation in the main scanning direction is applied in the second embodiment; therefore, the following description deals only with differences from the digital copying machine of the first embodiment.

The initialization of the read address and write address of the one-line memory used for scaling is performed at the beginning of a page, as in the case of the first embodiment, and the write region and readout region for each line are controlled independently, while the number of memory write data and the number of memory read data are set equal to each other. The incrementing of the read address is started with a delay of one line with respect to the write address. Here, the memory write address is incremented in accordance with the specified magnification ratio and with the position of the specified region. The memory read address is also incremented in accordance with the specified magnification ratio and with the position of the specified region. Since the write region and readout region for each line are controlled independently, the image position can also be moved (translated) in the main scanning direction. In this way, a translation as well as scaling in the main scanning direction can be performed in real time using a memory with one-line capacity.

Next, the timing chart shown in FIG. 14 will be explained. This timing chart illustrates the n-th line and (n+1)th line of a page in an enlargement process. In the n-th line, when the write enable signal WE is active, the write address WA is successively incremented from An in accordance with the write synchronization signal WCK. The write image data D are sequentially written at that address. The write address WA returns to address 0 when the memory capacity is exceeded. In the (n+1)th line, the write address WA is incremented starting from a value equal to one plus the last write address WA on the n-th line.

In the n-th line, when the read enable signal RE is active, the read address RA is successively incremented in accordance with the read synchronization signal RCK. Image data D is output from the memory in accordance with that address. As with the write address WA, the read address RA also returns to address 0 when the memory capacity is exceeded. In the (n+1)th line, the read address RA is incremented starting from a value equal to one plus the last read address on the n-th line. That is, since the number of image data written and the number of image data read out per line are the same, and since the read operation is delayed by one line with respect to the write operation, the first read address for the (n+1)th line is the same as the first write address An0 for the n-th line.

According to the embodiments described above, by performing the initialization of the write address and read address of the memory for scaling on a page by page basis, and by setting the number of write data equal to the number of read data for each line, it becomes possible to scale an image in the main scanning direction using a memory capacity of one line. Furthermore, despite memory write and read operations being performed simultaneously, scaling and translation operations can be performed in real time using a memory capacity of one line.

Further, by performing the initialization of the read address and write address of the memory used for scaling at the beginning of a page, and by separately controlling the write region and readout region for each line and setting the number of memory write data equal to the number of memory read data for each line, image scaling and translation in the main scanning direction can be performed in real time using a memory capacity of one line.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus which outputs image data by electrically scaling an image in synchronism with a prescribed clock, comprising:

a memory for storing image data input in synchronism with a prescribed pixel clock;

write address generator for initializing a write address on a page by page basis, and for incrementing the write address in the memory in accordance with a specified magnification ratio; and read address generator for initializing a read address on a page by page basis, and for incrementing the read address in the memory in accordance with the specified magnification ratio, wherein the read address generator starts incrementing the address with a delay of one line with respect to the write address generator, and an equal number of write addresses and read addresses are generated per line.

2. An image processing apparatus of claim 1, wherein the write address generator and the read address generator each increment the address back to 0 when the address is incremented from the final address.

3. An image processing apparatus of claim 1, wherein the number of write addresses generated per line and the number of read addresses generated per line are set equal to the number of image pixels before the scaling multiplied by a reduction ratio, where the reduction ratio is the magnification ratio M%/100 in the case of reducing and 1 in the case of enlarging, or the number of output image pixels after the scaling divided by an enlargement ratio, where the enlargement ratio is the magnification ratio M%/100 in the case of enlarging and 1 in the case of reducing, whichever is smaller.

4. An image processing apparatus of claim 1, wherein the number of write addresses generated per line and the number of read addresses generated per line are set equal to the number of image pixels before the scaling multiplied by a reduction ratio, where the reduction ratio is the magnification ratio M%/100 in the case of reducing and 1 in the case of enlarging, or the number of output image pixels after the scaling divided by an enlargement ratio, where the enlargement ratio is the magnification ratio M%/100 in the case of enlarging and 1 in the case of reducing, whichever is smaller.

5. An image processing apparatus which outputs image data by electrically scaling an image in synchronism with a prescribed clock, comprising:

a memory for storing image data input in synchronism with a prescribed pixel clock;

write address generator for initializing a write address on a page by page basis, and for incrementing the write address in the memory in accordance with a specified magnification ratio and with the position of a specified region; and read address generator for initializing a read address on a page by page basis, and for incrementing the read address in the memory in accordance with the specified magnification ratio and with the position of a specified region, wherein the read address generator starts incrementing the address with a delay of one line with respect to the write address generator, and an equal number of write addresses and read addresses are generated per line.

6. An image processing apparatus according to claim 5, wherein the write address generator and the read address generator each increment the address back to 0 when the address is incremented from the final address.

7. An image processing apparatus, comprising:

a memory for storing image data;

writing means for inputting image data of a number of pixels, the number of which is calculated by dividing the number of pixels included in one line by a magnification ratio, into a memory; and reading means for outputting the input image data in synchronism with a clock with respect to the magnification ratio, wherein a line output by the reading means is delayed for one line with respect to a line input by the writing means.

8. An image processing method, comprising the steps of:

inputting image data, the number of which is calculated by dividing the number of pixels included in one line by a magnification ratio, into a memory; and outputting the input image data from the memory in synchronism with a clock with respect to the magnification ratio, wherein a line of the output image data is delayed for one line with respect to a line of the input image data.

* * * * *